(12) United States Patent
Djebara

(10) Patent No.: US 8,125,769 B2
(45) Date of Patent: Feb. 28, 2012

(54) SOLID ELECTROLYTIC CAPACITOR ASSEMBLY WITH MULTIPLE CATHODE TERMINATIONS

(75) Inventor: Lotfi Djebara, Paris (FR)

(73) Assignee: AVX Corporation, Fountain Inn, SC (US)

( * ) Notice: Subject to any disclaimer, the term of this patent is extended or adjusted under 35 U.S.C. 154(b) by 15 days.

(21) Appl. No.: 12/841,453

(22) Filed: Jul. 22, 2010

(65) Prior Publication Data
US 2012/0019986 A1    Jan. 26, 2012

(51) Int. Cl.
*H01G 4/228* (2006.01)
*H01G 9/00* (2006.01)
(52) U.S. Cl. .......... 361/540; 361/528; 29/25.42
(58) Field of Classification Search .......... 361/540, 361/528, 538; 29/25.03
See application file for complete search history.

(56) References Cited

U.S. PATENT DOCUMENTS
3,345,545 A    10/1967    Bourgault et al.
(Continued)

FOREIGN PATENT DOCUMENTS
EP    1096519 A1    5/2001
(Continued)

OTHER PUBLICATIONS
Abstract of Japanese Patent No. JP2001284192, Oct. 12, 2001.
(Continued)

*Primary Examiner* — Eric Thomas
(74) *Attorney, Agent, or Firm* — Dority & Manning, P.A.

(57) ABSTRACT

A capacitor assembly containing a solid electrolytic capacitor element and an anode lead extending in a direction therefrom, first and second cathode terminations, and an anode termination is provided. The first cathode termination contains a first portion that is substantially parallel to a lower surface of the capacitor element and in electrical contact therewith, and the second cathode termination contains a second portion that is substantially parallel to an upper surface of the capacitor element and in electrical contact therewith. Through such a "sandwich" configuration, the degree of surface contact between the cathode terminations and capacitor element is increased, which can help dissipate heat and allow it to handle higher currents that would normally cause overheating. The terminations may also provide increased mechanical support.

15 Claims, 3 Drawing Sheets

U.S. PATENT DOCUMENTS

| | | | |
|---|---|---|---|
| 4,085,435 | A | 4/1978 | Galvagni |
| 4,203,194 | A | 5/1980 | McGrath |
| 4,931,901 | A | 6/1990 | Heron, Jr. |
| 4,945,452 | A | 7/1990 | Sturmer et al. |
| 5,198,968 | A | 3/1993 | Galvagni |
| 5,357,399 | A | 10/1994 | Salisbury |
| 5,377,073 | A | 12/1994 | Fukaumi et al. |
| 5,394,295 | A | 2/1995 | Galvagni et al. |
| 5,457,862 | A | 10/1995 | Sakata et al. |
| 5,461,537 | A | 10/1995 | Kobayashi et al. |
| 5,473,503 | A | 12/1995 | Sakata et al. |
| 5,478,965 | A | 12/1995 | Hashiba |
| 5,495,386 | A | 2/1996 | Kulkarni |
| 5,638,253 | A | 6/1997 | Hasegawa |
| 5,729,428 | A | 3/1998 | Sakata et al. |
| 5,812,367 | A | 9/1998 | Kudoh et al. |
| 5,949,639 | A | 9/1999 | Maeda et al. |
| 6,191,936 | B1 | 2/2001 | Webber et al. |
| 6,197,252 | B1 | 3/2001 | Bishop et al. |
| 6,238,444 | B1 | 5/2001 | Cadwallader |
| 6,243,605 | B1 | 6/2001 | Youker et al. |
| 6,322,912 | B1 | 11/2001 | Fife |
| 6,343,004 | B1 | 1/2002 | Kuranuki et al. |
| 6,391,275 | B1 | 5/2002 | Fife |
| 6,392,869 | B2 | 5/2002 | Shiraishi et al. |
| 6,400,556 | B1 | 6/2002 | Masuda et al. |
| 6,416,730 | B1 | 7/2002 | Fife |
| 6,527,937 | B2 | 3/2003 | Fife |
| 6,535,375 | B1 | 3/2003 | Jung et al. |
| 6,560,090 | B2 | 5/2003 | Uenishi et al. |
| 6,563,693 | B2 | 5/2003 | Nakada et al. |
| 6,576,099 | B2 | 6/2003 | Kimmel et al. |
| 6,592,740 | B2 | 7/2003 | Fife |
| 6,639,787 | B2 | 10/2003 | Kimmel et al. |
| 6,674,635 | B1 | 1/2004 | Fife et al. |
| 6,689,187 | B2 | 2/2004 | Oda |
| 6,751,833 | B2 | 6/2004 | Saito et al. |
| 6,757,152 | B2 | 6/2004 | Galvagni et al. |
| 6,816,358 | B2 | 11/2004 | Kida et al. |
| 6,819,546 | B2 | 11/2004 | Kuriyama |
| 6,912,117 | B2 | 6/2005 | Arai et al. |
| 6,970,344 | B2 | 11/2005 | Arai et al. |
| 6,985,353 | B2 | 1/2006 | Hirota et al. |
| 7,031,141 | B2 | 4/2006 | Kuriyama |
| 7,116,548 | B2 | 10/2006 | Satterfield, Jr. |
| 7,138,713 | B2 | 11/2006 | Kida et al. |
| 7,161,797 | B2 | 1/2007 | Vaisman et al. |
| 7,190,571 | B2 | 3/2007 | Heusmann et al. |
| 7,218,505 | B2 | 5/2007 | Naito et al. |
| 7,220,397 | B2 | 5/2007 | Kimmel et al. |
| 7,221,555 | B2 | 5/2007 | Goldberger |
| 7,262,511 | B2 | 8/2007 | Osako et al. |
| 7,341,705 | B2 | 3/2008 | Schnitter |
| 7,381,396 | B2 | 6/2008 | Thomas et al. |
| 7,419,926 | B2 | 9/2008 | Schnitter et al. |
| 7,468,882 | B2 | 12/2008 | Marek et al. |
| 7,594,937 | B2 | 9/2009 | Amita et al. |
| 2005/0168921 | A1* | 8/2005 | Sano et al. .......... 361/534 |
| 2009/0237867 | A1 | 9/2009 | Kurokawa |
| 2010/0177463 | A1 | 7/2010 | Kurokawa et al. |

FOREIGN PATENT DOCUMENTS

| | | |
|---|---|---|
| JP | 2161814 | 10/1989 |
| JP | 5055091 | 3/1993 |
| JP | 1128845 | 10/1999 |
| JP | 2004281749 A * | 10/2004 |

OTHER PUBLICATIONS

Abstract of Japanese Patent No. JP2002075807, Mar. 15, 2002.
Abstract of Japanese Patent No. JP2002164760, Jun. 7, 2002.
Abstract of Japanese Patent No. JP2003267404, Sep. 25, 2003.
Abstract of Japanese Patent No. JP10144573, May 29, 1998.
Abstract of Japanese Patent No. JP11274008, Oct. 8, 1999.
Abstract of Japanese Patent No. JP3145115, Jun. 20, 1991.
Abstract of Japanese Patent No. JP4236415, Aug. 25, 1992.
Abstract of Japanese Patent No. JP5234829, Sep. 10, 1993.
Abstract of Japanese Patent No. JP6168854, Jun. 14, 1994.
Abstract of Japanese Patent No. JP6232012, Aug. 19, 1994.
Abstract of Japanese Patent No. JP6283391, Oct. 7, 1994.
Abstract of Japanese Patent No. JP7183167, Jul. 21, 1995.
Abstract of Japanese Patent No. JP7183170, Jul. 21, 1995.
Abstract of Japanese Patent No. JP7240351, Sep. 12, 1995.
Abstract of Japanese Patent No. JP8115855, May 7, 1996.
Article—*Lowest ESR at High Voltage—Multianode Tantalum Capacitors*, Horacek et al., CARTS 2004: 24th Annual Capacitor and Resistor Technology Symposium, Mar. 29-Apr. 1 and Advancing Microelectronics, Jul./Aug. 2006, pp. 26-28.
Article—*Low ESR and Low Profile Technology on Niobium Oxide*, Zedníček et al.,CARTS 2004, CONF 24, pp. 223-231.
Product Information—NBM Multianodes OxiCap™ Ultra Low ESR Capacitor COTS-Plus from AVX Corporation, 2 pages.
Poster—"Hitachi Tantalum Capacitor Development Road Map" Hitachi AIC Inc., CEATEC 2003, Japan, Oct. 7-11, 2003.
Search Report for GB1110054.2 dated Oct. 13, 2011, 4 pages.

* cited by examiner

SOLID ELECTROLYTIC CAPACITOR ASSEMBLY WITH MULTIPLE CATHODE TERMINATIONS

BACKGROUND OF THE INVENTION

Solid electrolytic capacitors (e.g., tantalum capacitors) have been a major contributor to the miniaturization of electronic circuits and have made possible the application of such circuits in extreme environments. Many conventional solid electrolytic capacitors are formed with terminations that can be surface mounted onto a printed circuit board. Metal leadframes, for example, are often provided with anode and cathode terminations. The anode termination may contain a portion that is bent upwardly toward the capacitor and welded to a wire extending from the anode. The cathode termination may be flat and receive the bottom surface of the capacitor. One problem with such conventional solid electrolytic capacitors, however, is that ripple frequencies can cause damaging heat to be generated within the capacitor due to the current flow across resistive imperfections, which leads to a relatively high equivalent series resistance (ESR). As such, a need currently exists for an improved solid electrolytic capacitor assembly.

SUMMARY OF THE INVENTION

In accordance with one embodiment of the present invention, a capacitor assembly is disclosed that comprises a capacitor element that includes an anode, dielectric layer overlying the anode, and a cathode overlying the dielectric layer that includes a solid electrolyte. An anode lead extends in a direction from the capacitor element and is electrically connected to the anode. A first anode termination is electrically connected to the anode lead. The assembly also comprises a first cathode termination that contains a first portion that is substantially parallel to and in electrical contact with a lower surface of the capacitor element, and a second cathode termination that contains a second portion that is substantially parallel to and in electrical contact with an upper surface of the capacitor element.

In accordance with another embodiment of the present invention, a method for forming a capacitor assembly is disclosed. The method comprises providing a solid electrolytic capacitor element from which extends an anode lead in a direction; positioning the capacitor element onto a first leadframe that contains a first anode termination and a first cathode termination, wherein the first cathode termination contains a first portion that is substantially parallel to a lower surface of the capacitor element and in electrical contact therewith, and wherein the first anode termination contains a recess within which the anode lead is received; electrically connecting the anode lead to the first anode termination; positioning a second leadframe onto the capacitor element that contains a second cathode termination, wherein the second cathode termination contains a second portion that is substantially parallel to an upper surface of the capacitor element and in electrical contact therewith; and electrically connecting the capacitor element to the first and second cathode terminations.

Other features and aspects of the present invention are set forth in greater detail below.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

Figure 1:
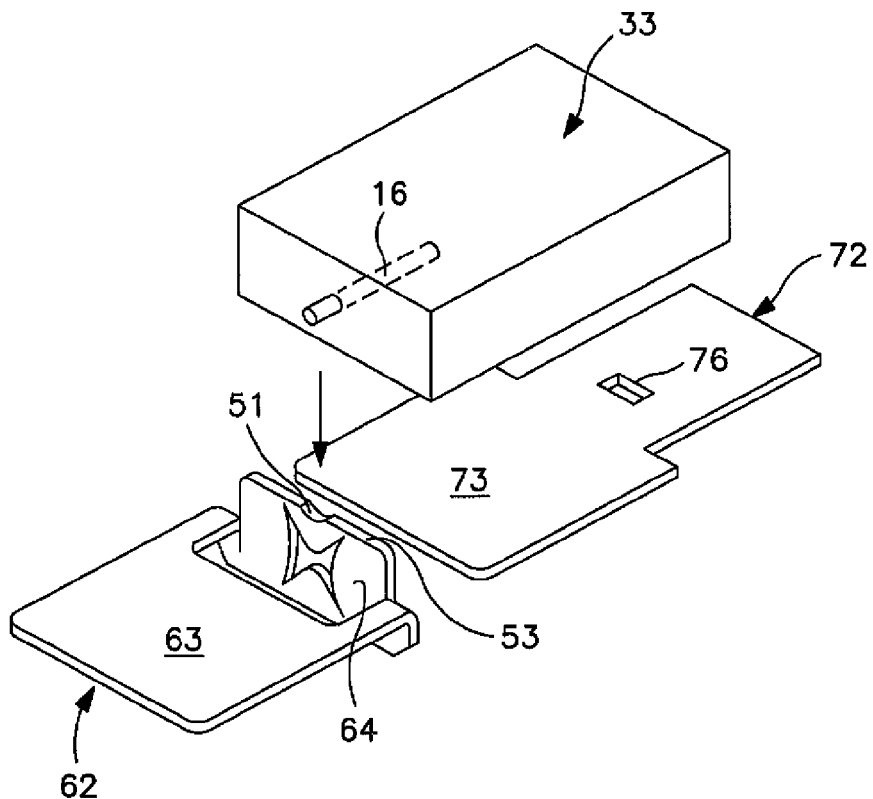
FIG. 1 is a perspective view of one embodiment for mounting a capacitor element to a first anode termination and a first cathode termination.

Repeat use of reference characters in the present specification and drawings is intended to represent the same or analogous features or elements of the present invention.

DETAILED DESCRIPTION OF REPRESENTATIVE EMBODIMENTS

It is to be understood by one of ordinary skill in the art that the present discussion is a description of exemplary embodiments only, and is not intended as limiting the broader aspects of the present invention.

Generally speaking, the present invention is directed to a capacitor assembly containing a solid electrolytic capacitor element and an anode lead extending in a direction therefrom, first and second cathode terminations, and an anode termination. The first cathode termination contains a first portion that is substantially parallel to a lower surface of the capacitor element and in electrical contact therewith, and the second cathode termination contains a second portion that is substantially parallel to an upper surface of the capacitor element and in electrical contact therewith. Through such a "sandwich" configuration, the degree of surface contact between the cathode terminations and capacitor element is increased, which can help dissipate heat and allow it to handle higher currents that would normally cause overheating. The terminations may also provide increased mechanical support.

Figure 4:
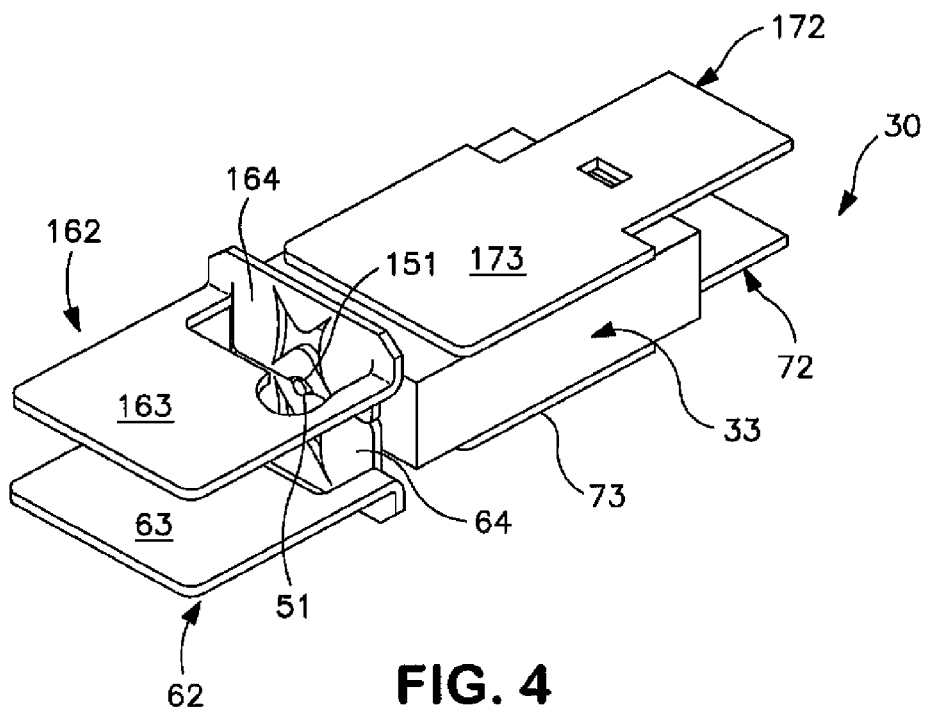
FIG. 4 is a perspective view of an assembly containing the capacitor element of FIG. 1 mounted to the first and second anode and cathode terminations.
Figure 5:
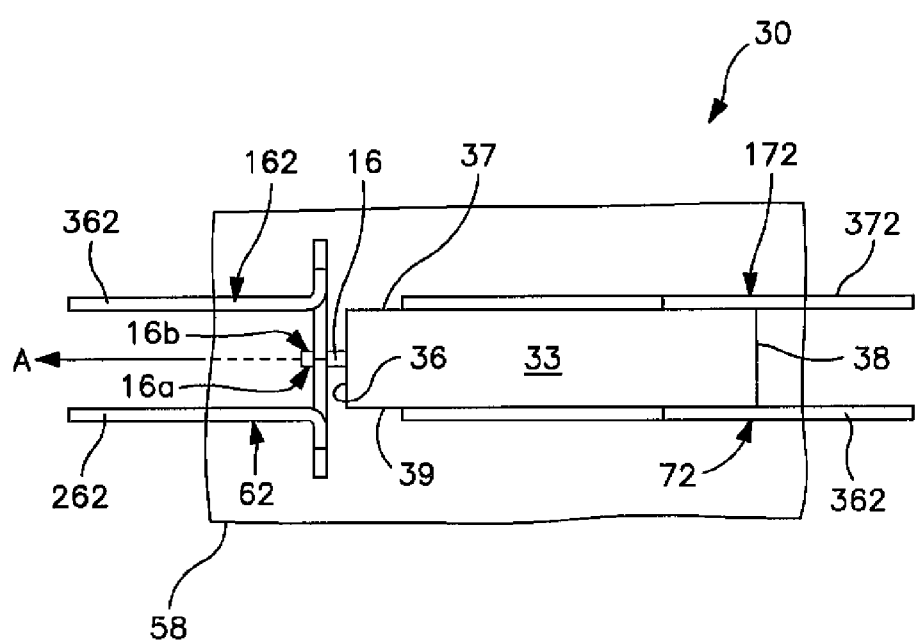
FIG. 5 is a side view of the capacitor assembly of FIG. 4.

Referring to FIGS. 4 and 5, one embodiment of a capacitor assembly 30 is shown that includes a first cathode termination 72 and second cathode termination 172 in electrical contact with a capacitor element 33. More particularly, the first cathode termination 72 contains a first portion 73 that is positioned substantially parallel to and in electrical contact with a lower surface 39 of the capacitor element 33. The first cathode termination 72 may also contain a portion 74. Although illustrated in a "flat" configuration, the portion 74 may also be positioned at an angle relative to the first portion 73 (e.g., substantially perpendicular) and optionally in electrical contact with the rear surface 38 of the capacitor element 33. In this regard, the portion 74 may define an aperture 76 to facilitate its ability to be bent. Although depicted as being integral, it should also be understood that these portions may alternatively be separate pieces that are connected together, either directly or via an additional conductive element (e.g., metal).

The second cathode termination 172 likewise contains a second portion 173 that is positioned substantially parallel to and in electrical contact with an upper surface 37 of the capacitor element 33. As described above, the second cathode termination 172 may also contain a portion 174, which may be "flat" or positioned at an angle relative to the second portion 173 (e.g., substantially perpendicular) and optionally in electrical contact with the rear surface 38 of the capacitor element 33.

As shown, the capacitor assembly also contains a first anode termination 62 that is in electrical contact with an anode lead 16 of the capacitor element 33. The anode lead 16 (e.g., wire, sheet, etc.) extends from any surface of the capacitor element 33, such as a front surface 36, rear surface 38, upper surface 37, and/or lower surface 39. In the illustrated embodiment, for example, the lead 16 is in the form of an embedded wire that extends in a longitudinal direction "A" from the front surface 36 of the capacitor element 33. The anode lead 16 is formed from an electrically conductive material, such as tantalum, niobium, nickel, aluminum, hafnium, titanium, etc., as well as oxides and/or nitrides of thereof. The lead 16 is in electrical contact with the anode of the capacitor element 33 and be connected therewith in a variety of ways as is known in the art, such as by coupling the lead using resistance or laser welding, embedding the lead 16 into the anode during its formation (e.g., prior to sintering), etc.

In the illustrated embodiment, the first anode termination 62 contains a third portion 64 that is positioned at an angle relative to the direction in which the lead 16 extends. For example, the third portion 64 may be substantially perpendicular (e.g., 90°±5°) to the longitudinal direction "A." An upper surface 53 of the third portion 64 defines a recess 51 (See FIG. 1) for receiving the anode lead 16. If desired, the third portion 64 may also define an opening 69 that facilitates the handling of the anode termination 62 while connecting it to the capacitor element 33. The opening 69 may be defined between opposing arcuate surfaces that help increase strength (See FIG. 3). The first anode termination 62 may also contain an optional fourth portion 63 that is positioned substantially parallel to the lower surface 39 of the capacitor element 33 and substantially perpendicular to the third portion 64. The fourth portion 63 may remain in a "flat" configuration in the resulting capacitor assembly, or it may be bent into an angled configuration if so desired. Although depicted as being integral, it should also be understood that these portions may alternatively be separate pieces that are connected together, either directly or via an additional conductive element (e.g., metal).

Optionally, a second anode termination 162 may also be employed. In the illustrated embodiment, the second anode termination 162 contains a fifth portion 164 that is positioned at an angle relative to the direction in which the lead 16 extends (e.g., substantially perpendicular to the longitudinal direction "A"). A lower surface 153 of the fifth portion 164 defines a recess 151 (See FIG. 3) for receiving the anode lead 16. The fifth portion 164 may also define an opening 169 that facilitates the handling of the anode termination 162 (See FIG. 3). Likewise, as described above, the second anode termination 162 may also contain an optional sixth portion 163 that is positioned substantially parallel to the lower surface 39 of the capacitor element 33 and substantially perpendicular to the fifth portion 164. The sixth portion 163 may remain in a "flat" configuration in the resulting capacitor assembly, or it may be bent into an angled configuration if so desired.

The recesses 51 and 151 in the anode terminations are shown herein as being located on a particular surface. Nevertheless, it should be understood that they may also be located on other surfaces of their respective anode terminations.

Further, more than one recess may also be defined in each anode termination, particularly in those embodiments in which multiple anode leads are employed. Still further, additional terminations may also be employed, with or without such recesses. In any event, the recesses 51 and 151 of the first and second anode terminations may be mated together so that the anode lead 16 is positioned therebetween. More specifically, a lower section 16a of the anode lead 16 may be positioned adjacent to the recess 51 and an upper section 16b of the anode lead 16 may be positioned adjacent to the recess 151. The shape and size of the recesses 51 and 151 may vary as desired to accommodate the desired section of the anode lead 16. In the illustrated embodiment, for example, both of the recesses 51 and 151 have a curved shape which, when mated together, can form an elliptical or circular slot for accommodating a cylindrical anode lead 16. Of course, other shapes and/or sizes are also suitable. Exemplary shapes for the slot formed by the mated recesses may include, for instance, circular, elliptical, oval, rectangular, diamond, square, etc. Likewise, exemplary shapes for the recesses themselves may include, for instance, curved shapes (e.g., U-shaped, semicircular, etc.), V-shaped, etc.

Any conductive material may be employed to form the aforementioned terminations, such as a conductive metal (e.g., copper, nickel, silver, nickel, zinc, tin, palladium, lead, copper, aluminum, molybdenum, titanium, iron, zirconium, magnesium, and alloys thereof). Particularly suitable conductive metals include, for instance, copper, copper alloys (e.g., copper-zirconium, copper-magnesium, copper-zinc, or copper-iron), nickel, and nickel alloys (e.g., nickel-iron). The thickness of the terminations is generally selected to minimize the thickness of the capacitor. For instance, the thickness of the terminations may range from about 0.05 to about 1 millimeter, in some embodiments from about 0.05 to about 0.5 millimeters, and from about 0.07 to about 0.2 millimeters. One exemplary conductive material is a copper-iron alloy metal plate available from Wieland (Germany). If desired, the surface of the terminations may be electroplated with nickel, silver, gold, tin, etc. as is known in the art to ensure that the final part is mountable to the circuit board. In one particular embodiment, both surfaces of the terminations are plated with nickel and silver flashes, respectively, while the mounting surface is also plated with a tin solder layer.

An exemplary manner in which a capacitor element is attached to the terminations will now be described in more detail with reference to FIGS. 1-3. For sake of simplicity, the formation of only a single capacitor assembly will be described. It should be understood, however, that the leadframes may contain multiple terminations that are cut into individual capacitor assemblies. Referring to FIG. 1, a portion of a first leadframe is shown that contains first anode and cathode terminations 62 and 72, such as described above. It should be understood that only a portion of the leadframe is shown, and that it will generally contain other components not expressly shown. For example, the terminations may be initially connected via a metal sheet that is subsequently removed during manufacture of the capacitor.

The first leadframe of FIG. 1 is shown in a configuration in which the first portion 64 has been bent upwardly from the portion 63 and in which the cathode termination 72 is in a "flat" configuration. As indicated by the directional arrow in FIG. 1, the capacitor element 33 is positioned so that its lower surface 39 contacts the portion 73 of the first cathode termination 72, and so that the anode lead 16 is received by the recess 51. If desired, a conductive adhesive (not shown) may be positioned between the first cathode termination 72 and the capacitor element 33 to improve the degree of attachment. The conductive adhesive may include, for instance, conductive metal particles contained with a resin composition. The metal particles may be silver, copper, gold, platinum, nickel, zinc, bismuth, etc. The resin composition may include a thermoset resin (e.g., epoxy resin), curing agent (e.g., acid anhydride), and coupling agent (e.g., silane coupling agents). One particularly suitable adhesive is a silver-loaded epoxy resin available from Emerson and Cuming under the name "Amicon CE 3513." Other suitable conductive adhesives are described in U.S. Patent Application Publication No. 2006/0038304 to Osako, et al., which is incorporated herein in its entirety by reference thereto for all purposes.

The anode lead 16 may be electrically connected to the first termination 62 at the recess 51 using any technique known in the art, such as mechanical welding, laser welding, conductive adhesives, etc. In one embodiment, for example, the anode lead 16 is welded (e.g., laser welded) at the recess 51.

Figure 2:
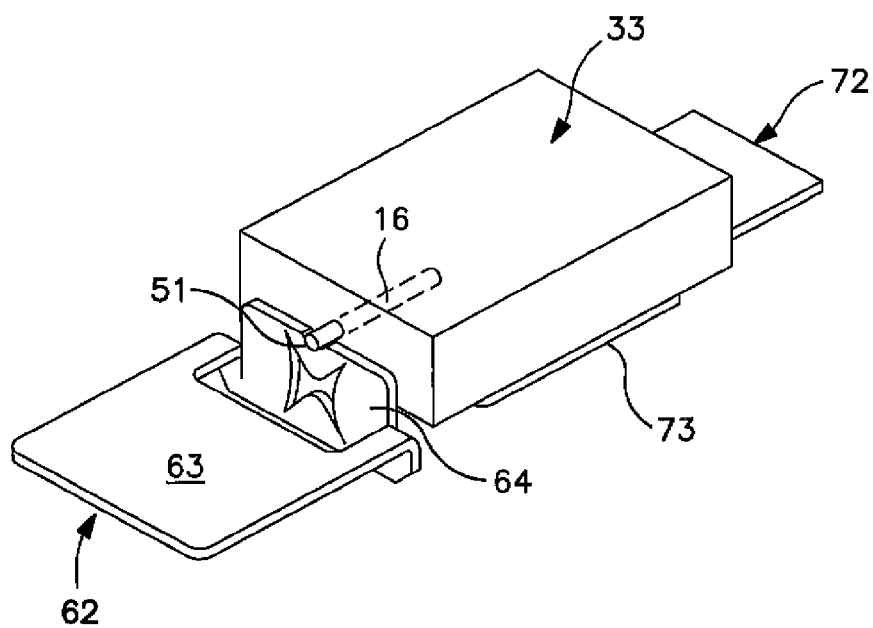
FIG. 2 is a perspective view of an assembly that contains the capacitor element of FIG. 1 mounted to the first anode and cathode terminations.
Figure 3:
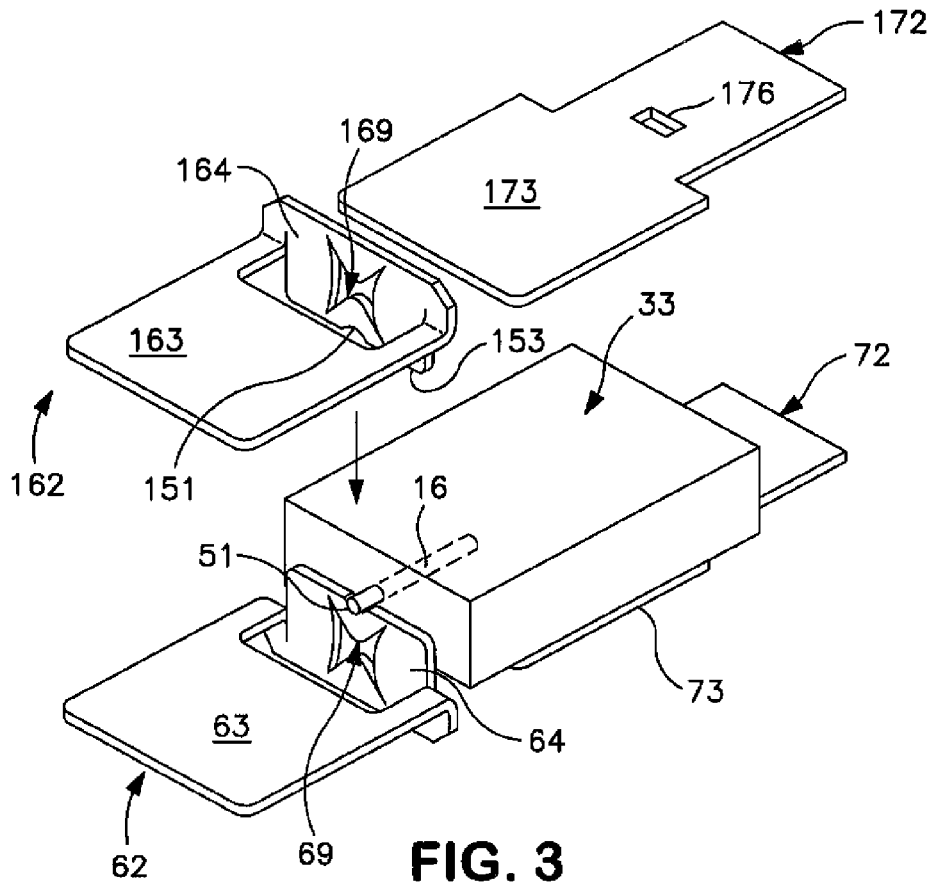
FIG. 3 is a perspective view of one embodiment for mounting the assembly of FIG. 2 to a second anode termination and a second cathode termination.

Once the "pre-assembly" of FIG. 2 is formed, a second leadframe may be connected thereto. More specifically, the second leadframe of FIG. 3 is shown in a configuration in which the second portion 164 has been bent upwardly from the portion 163 and in which the second cathode termination 172 is in a "flat" configuration. As indicated by the directional arrow in FIG. 3, the capacitor element 33 is positioned so that its upper surface 37 contacts the portion 173 of the second cathode termination 172, and so that the anode lead 16 is received by the recess 151. If desired, a conductive adhesive (not shown) may be positioned between the second cathode termination 172 and the capacitor element 33 to improve the degree of attachment. The anode lead 16 may be electrically connected to second termination 162 at the recess 151 using any technique known in the art, such as mechanical welding, laser welding, conductive adhesives, etc. In one embodiment, for example, the anode lead 16 is connected at the recess 151 using a conductive adhesive. Any adhesives employed may then be cured using known techniques. For example, a heat press may be used to apply heat and pressure to ensure that the capacitor element 33 is adequately adhered to the first cathode termination 72, second cathode termination 172, and second anode termination 162. The resulting capacitor assembly 30 is shown in FIG. 4.

Once the capacitor element is attached, the lead frame is enclosed within a resin casing 58 (FIG. 5), which be filled with silica or any other known encapsulating material. The width and length of the case may vary depending on the intended application. Suitable casings may include, for instance, "A", "B", "F", "G", "H", "J", "K", "L", "M", "N", "P", "R", "S", "T", "W", "Y", or "X" cases (AVX Corporation). After encapsulation, exposed portions 262 and 272 of the respective first anode and cathode terminations 62 and 72 may be trimmed and/or bent along the outside of the casing 58 (e.g., at an approximately 90° angle). Likewise, exposed portions 362 and 372 of the respective second anode and cathode terminations 162 and 172 may also be trimmed and bent along the outside of the casing 58 (e.g., at an approximately 90° angle). In this manner, the exposed portions can each form J-shaped leads for the finished capacitor assembly 30, although any other known configuration may also be formed in accordance with the present invention.

The capacitor element employed in the assembly described above and shown herein generally contains an anode, dielectric, and solid electrolyte. The anode may be formed from a valve metal composition having a high specific charge, such as about 5,000 μF*V/g or more, in some embodiments about 25,000 μF*V/g or more, in some embodiments about 40,000 μF*V/g or more, and in some embodiments, from about 70,000 to about 200,000 μF*V/g or more. The valve metal composition contains a valve metal (i.e., metal that is capable of oxidation) or valve metal-based compound, such as tantalum, niobium, aluminum, hafnium, titanium, alloys thereof, oxides thereof, nitrides thereof, and so forth. For example, the valve metal composition may contain an electrically conductive oxide of niobium, such as niobium oxide having an atomic ratio of niobium to oxygen of 1:1.0±1.0, in some embodiments 1:1.0±0.3, in some embodiments 1:1.0±0.1, and in some embodiments, 1:1.0±0.05. For example, the niobium oxide may be $NbO_{0.7}$, $NbO_{1.0}$, $NbO_{1.1}$, and $NbO_2$. In a preferred embodiment, the composition contains $NbO_{1.0}$, which is a conductive niobium oxide that may remain chemically stable even after sintering at high temperatures. Examples of such valve metal oxides are described in U.S. Pat. No. 6,322,912 to Fife; U.S. Pat. No. 6,391,275 to Fife et al.; U.S. Pat. No. 6,416,730 to Fife et al.; U.S. Pat. No. 6,527,937 to Fife; U.S. Pat. No. 6,576,099 to Kimmel, et al.; U.S. Pat. No. 6,592,740 to Fife, et al.; and U.S. Pat. No. 6,639,787 to Kimmel, et al.; and U.S. Pat. No. 7,220,397 to Kimmel, et al., as well as U.S. Patent Application Publication Nos. 2005/0019581 to Schnitter; 2005/0103638 to Schnitter, et al.; 2005/0013765 to Thomas, et al., all of which are incorporated herein in their entirety by reference thereto for all purposes.

Conventional fabricating procedures may generally be utilized to form the anode. In one embodiment, a tantalum or niobium oxide powder having a certain particle size is first selected. For example, the particles may be flaked, angular, nodular, and mixtures or variations thereof. The particles also typically have a screen size distribution of at least about 60 mesh, in some embodiments from about 60 to about 325 mesh, and in some embodiments, from about 100 to about 200 mesh. Further, the specific surface area is from about 0.1 to about 10.0 $m^2/g$, in some embodiments from about 0.5 to about 5.0 $m^2/g$, and in some embodiments, from about 1.0 to about 2.0 $m^2/g$. The term "specific surface area" refers to the surface area determined by the physical gas adsorption (B.E.T.) method of Bruanauer, Emmet, and Teller, Journal of American Chemical Society, Vol. 60, 1938, p. 309, with nitrogen as the adsorption gas. Likewise, the bulk (or Scott) density is typically from about 0.1 to about 5.0 $g/cm^3$, in some embodiments from about 0.2 to about 4.0 $g/cm^3$, and in some embodiments, from about 0.5 to about 3.0 $g/cm^3$.

To facilitate the construction of the anode, other components may be added to the electrically conductive particles. For example, the electrically conductive particles may be optionally mixed with a binder and/or lubricant to ensure that the particles adequately adhere to each other when pressed to form the anode body. Suitable binders may include camphor, stearic and other soapy fatty acids, Carbowax (Union Carbide), Glyptal (General Electric), polyvinyl alcohols, naphthalene, vegetable wax, and microwaxes (purified paraffins). The binder may be dissolved and dispersed in a solvent. Exemplary solvents may include water, alcohols, and so forth. When utilized, the percentage of binders and/or lubricants may vary from about 0.1% to about 8% by weight of the total mass. It should be understood, however, that binders and lubricants are not required in the present invention.

The resulting powder may be compacted using any conventional powder press mold. For example, the press mold may be a single station compaction press using a die and one or multiple punches. Alternatively, anvil-type compaction press molds may be used that use only a die and single lower punch. Single station compaction press molds are available in several basic types, such as cam, toggle/knuckle and eccentric/crank presses with varying capabilities, such as single action, double action, floating die, movable platen, opposed ram, screw, impact, hot pressing, coining or sizing. The powder may be compacted around an anode lead (e.g., tantalum wire). It should be further appreciated that the anode lead may alternatively be attached (e.g., welded) to the anode body subsequent to pressing and/or sintering of the anode body.

After compression, any binder/lubricant may be removed by heating the pellet under vacuum at a certain temperature (e.g., from about 150° C. to about 500° C.) for several minutes. Alternatively, the binder/lubricant may also be removed by contacting the pellet with an aqueous solution, such as described in U.S. Pat. No. 6,197,252 to Bishop, et al., which is incorporated herein in its entirety by reference thereto for all purposes. Thereafter, the pellet is sintered to form a porous, integral mass. For example, in one embodiment, the pellet may be sintered at a temperature of from about 1200° C. to about 2000° C., and in some embodiments, from about 1500° C. to about 1800° C. under vacuum or an inert atmosphere. Upon sintering, the pellet shrinks due to the growth of bonds between the particles. In addition to the techniques described above, any other technique for constructing the anode body may also be utilized in accordance with the present invention, such as described in U.S. Pat. No. 4,085,435 to Galvagni; U.S. Pat. No. 4,945,452 to Sturmer, et al.; U.S. Pat. No. 5,198,968 to Galvagni; U.S. Pat. No. 5,357,399 to Salisbury; U.S. Pat. No. 5,394,295 to Galvagni, et al.; U.S. Pat. No. 5,495,386 to Kulkarni; and U.S. Pat. No. 6,322,912 to Fife, which are incorporated herein in their entirety by reference thereto for all purposes.

Although not required, the thickness of the anode may be selected to improve the electrical performance of the capacitor. For example, the thickness of the anode may be about 4 millimeters or less, in some embodiments, from about 0.05 to about 2 millimeters, and in some embodiments, from about 0.1 to about 1 millimeter. The shape of the anode may also be selected to improve the electrical properties of the resulting capacitor. For example, the anode may have a shape that is curved, sinusoidal, rectangular, U-shaped, V-shaped, etc. The anode may also have a "fluted" shape in that it contains one or more furrows, grooves, depressions, or indentations to increase the surface to volume ratio to minimize ESR and extend the frequency response of the capacitance. Such "fluted" anodes are described, for instance, in U.S. Pat. No. 6,191,936 to Webber, et al.; U.S. Pat. No. 5,949,639 to Maeda, et al.; and U.S. Pat. No. 3,345,545 to Bourgault et al., as well as U.S. Patent Application Publication No. 2005/0270725 to Hahn, et al., all of which are incorporated herein in their entirety by reference thereto for all purposes.

Once constructed, the anode may be anodized so that a dielectric layer is formed over and/or within the anode. Anodization is an electrochemical process by which the anode is oxidized to form a material having a relatively high dielectric constant. For example, a niobium oxide (NbO) anode may be anodized to niobium pentoxide ($Nb_2O_5$). Typically, anodization is performed by initially applying an electrolyte to the anode, such as by dipping anode into the electrolyte. The electrolyte is generally in the form of a liquid, such as a solution (e.g., aqueous or non-aqueous), dispersion, melt, etc. A solvent is generally employed in the electrolyte, such as water (e.g., deionized water); ethers (e.g., diethyl ether and tetrahydrofuran); alcohols (e.g., methanol, ethanol, n-propanol, isopropanol, and butanol); triglycerides; ketones (e.g., acetone, methyl ethyl ketone, and methyl isobutyl ketone); esters (e.g., ethyl acetate, butyl acetate, diethylene glycol ether acetate, and methoxypropyl acetate); amides (e.g., dimethylformamide, dimethylacetamide, dimethylcaprylic/capric fatty acid amide and N-alkylpyrrolidones); nitriles (e.g., acetonitrile, propionitrile, butyronitrile and benzonitrile); sulfoxides or sulfones (e.g., dimethyl sulfoxide (DMSO) and sulfolane); and so forth. The solvent may constitute from about 50 wt. % to about 99.9 wt. %, in some embodiments from about 75 wt. % to about 99 wt. %, and in some embodiments, from about 80 wt. % to about 95 wt. % of the electrolyte. Although not necessarily required, the use of an aqueous solvent (e.g., water) is often desired to help achieve the desired oxide. In fact, water may constitute about 50 wt. % or more, in some embodiments, about 70 wt. % or more, and in some embodiments, about 90 wt. % to about 100 wt. % of the solvent(s) used in the electrolyte.

The electrolyte is ionically conductive and may have an ionic conductivity of about 1 milliSiemens per centimeter ("mS/cm") or more, in some embodiments about 30 mS/cm or more, and in some embodiments, from about 40 mS/cm to about 100 mS/cm, determined at a temperature of 25° C. To enhance the ionic conductivity of the electrolyte, a compound may be employed that is capable of dissociating in the solvent to form ions. Suitable ionic compounds for this purpose may include, for instance, acids, such as hydrochloric acid, nitric acid, sulfuric acid, phosphoric acid, polyphosphoric acid, boric acid, boronic acid, etc.; organic acids, including carboxylic acids, such as acrylic acid, methacrylic acid, malonic acid, succinic acid, salicylic acid, sulfosalicylic acid, adipic acid, maleic acid, malic acid, oleic acid, gallic acid, tartaric acid, citric acid, formic acid, acetic acid, glycolic acid, oxalic acid, propionic acid, phthalic acid, isophthalic acid, glutaric acid, gluconic acid, lactic acid, aspartic acid, glutaminic acid, itaconic acid, trifluoroacetic acid, barbituric acid, cinnamic acid, benzoic acid, 4-hydroxybenzoic acid, aminobenzoic acid, etc.; sulfonic acids, such as methanesulfonic acid, benzenesulfonic acid, toluenesulfonic acid, trifluoromethanesulfonic acid, styrenesulfonic acid, naphthalene disulfonic acid, hydroxybenzenesulfonic acid, dodecylsulfonic acid, dodecylbenzenesulfonic acid, etc.; polymeric acids, such as poly(acrylic) or poly(methacrylic) acid and copolymers thereof (e.g., maleic-acrylic, sulfonic-acrylic, and styrene-acrylic copolymers), carageenic acid, carboxymethyl cellulose, alginic acid, etc.; and so forth. The concentration of ionic compounds is selected to achieve the desired ionic conductivity. For example, an acid (e.g., phosphoric acid) may constitute from about 0.01 wt. % to about 5 wt. %, in some embodiments from about 0.05 wt. % to about 0.8 wt. %, and in some embodiments, from about 0.1 wt. % to about 0.5 wt. % of the electrolyte. If desired, blends of ionic compounds may also be employed in the electrolyte.

A current is passed through the electrolyte to form the dielectric layer. The value of voltage manages the thickness of the dielectric layer. For example, the power supply may be initially set up at a galvanostatic mode until the required voltage is reached. Thereafter, the power supply may be switched to a potentiostatic mode to ensure that the desired dielectric thickness is formed over the surface of the anode. Of course, other known methods may also be employed, such as pulse or step potentiostatic methods. The voltage typically ranges from about 4 to about 200 V, and in some embodiments, from about 9 to about 100 V. During anodic oxidation, the electrolyte can be kept at an elevated temperature, such as about 30° C. or more, in some embodiments from about 40° C. to about 200° C., and in some embodiments, from about 50° C. to about 100° C. Anodic oxidation can also be done at ambient temperature or lower. The resulting dielectric layer may be formed on a surface of the anode and within its pores.

Once the dielectric layer is formed, a protective coating may optionally be applied, such as one made of a relatively insulative resinous material (natural or synthetic). Such materials may have a specific resistivity of greater than about 10 $\Omega$/cm, in some embodiments greater than about 100, in some embodiments greater than about 1,000 $\Omega$/cm, in some embodiments greater than about $1\times10^5$ $\Omega$/cm, and in some embodiments, greater than about $1\times10^{10}$ $\Omega$/cm. Some resinous materials that may be utilized in the present invention include, but are not limited to, polyurethane, polystyrene, esters of unsaturated or saturated fatty acids (e.g., glycerides), and so forth. For instance, suitable esters of fatty acids include, but are not limited to, esters of lauric acid, myristic acid, palmitic acid, stearic acid, eleostearic acid, oleic acid, linoleic acid, linolenic acid, aleuritic acid, shellolic acid, and so forth. These esters of fatty acids have been found particularly useful when used in relatively complex combinations to form a "drying oil", which allows the resulting film to rapidly polymerize into a stable layer. Such drying oils may include mono-, di-, and/or tri-glycerides, which have a glycerol backbone with one, two, and three, respectively, fatty acyl residues that are esterified. For instance, some suitable drying oils that may be used include, but are not limited to, olive oil, linseed oil, castor oil, tung oil, soybean oil, and shellac. These and other protective coating materials are described in more detail U.S. Pat. No. 6,674,635 to Fife, et al., which is incorporated herein in its entirety by reference thereto for all purposes.

The anodized part is thereafter subjected to a step for forming a cathode that includes a solid electrolyte, such as a manganese dioxide, conductive polymer, etc. A manganese dioxide solid electrolyte may, for instance, be formed by the pyrolytic decomposition of manganous nitrate ($Mn(NO_3)_2$). Such techniques are described, for instance, in U.S. Pat. No. 4,945,452 to Sturmer, et al., which is incorporated herein in its entirety by reference thereto for all purposes. Alternatively, a conductive polymer coating may be employed that contains one or more polyheterocycles (e.g., polypyrroles; polythiophenes, poly(3,4-ethylenedioxythiophene) (PEDT); polyanilines); polyacetylenes; poly-p-phenylenes; polyphenolates; and derivatives thereof. Moreover, if desired, the conductive polymer coating may also be formed from multiple conductive polymer layers. For example, in one embodiment, the conductive polymer cathode may contain one layer formed from PEDT and another layer formed from a polypyrrole. Various methods may be utilized to apply the conductive polymer coating onto the anode part. For instance, conventional techniques such as electropolymerisation, screen-printing, dipping, electrophoretic coating, and spraying, may be used to form a conductive polymer coating. In one embodiment, for example, the monomers) used to form the conductive polymer (e.g., 3,4-ethylenedioxy-thiophene) may initially be mixed with a polymerization catalyst to form a solution. For example, one suitable polymerization catalyst is CLEVIOS C, which is iron III toluene-sulfonate and sold by H.C. Starck. CLEVIOS C is a commercially available catalyst for CLEVIOS M, which is 3,4-ethylene dioxythiophene, a PEDT monomer also sold by H.C. Starck. Once a catalyst dispersion is formed, the anode part may then be dipped into the dispersion so that the polymer forms on the surface of the anode part. Alternatively, the catalyst and monomer(s) may also be applied separately to the anode part. In one embodiment, for example, the catalyst may be dissolved in a solvent (e.g., butanol) and then applied to the anode part as a dipping solution. The anode part may then be dried to remove the solvent therefrom. Thereafter, the anode part may be dipped into a solution containing the appropriate monomer. Once the monomer contacts the surface of the anode part containing the catalyst, it chemically polymerizes thereon. In addition, the catalyst (e.g., CLEVIOS C) may also be mixed with the materials) used to form the optional protective coating (e.g., resinous materials). In such instances, the anode part may then be dipped into a solution containing the monomer (CLEVIOS M). As a result, the monomer can contact the catalyst within and/or on the surface of the protective coating and react therewith to form the conductive polymer coating.

Although various methods have been described above, it should be understood that any other method for applying the conductive coating(s) to the anode part may also be utilized in the present invention. For example, other methods for applying such conductive polymer coating(s) may be described in U.S. Pat. No. 5,457,862 to Sakata, et al., U.S. Pat. No. 5,473,503 to Sakata, et al., U.S. Pat. No. 5,729,428 to Sakata, et al., and U.S. Pat. No. 5,812,367 to Kudoh, et al., which are incorporated herein in their entirety by reference thereto for all purposes.

In most embodiments, once applied, the solid electrolyte is healed. Healing may occur after each application of a solid electrolyte layer or may occur after the application of the entire coating. In some embodiments, for example, the solid electrolyte may be healed by dipping the pellet into an electrolyte solution, such as a solution of phosphoric acid and/or sulfuric acid, and thereafter applying a constant voltage to the solution until the current is reduced to a preselected level. If desired, such healing may be accomplished in multiple steps. For instance, in one embodiment, a pellet having a conductive polymer coating is first dipped in phosphoric acid and applied with about 20 Volts and then dipped in sulfuric acid and applied with about 2 Volts. In this embodiment, the use of the second low voltage sulfuric acid solution or toluene sulfonic acid can help increase capacitance and reduce the dissipation factor (DF) of the resulting capacitor. After application of some or all of the layers described above, the pellet may then be washed if desired to remove various byproducts, excess catalysts, and so forth. Further, in some instances, drying may be utilized after some or all of the dipping operations described above. For example, drying may be desired after applying the catalyst and/or after washing the pellet in order to open the pores of the pellet so that it can receive a liquid during subsequent dipping steps.

If desired, the part may optionally be applied with an external coating. The external coating may contain at least one carbonaceous layer and at least one metal layer that overlies the carbonaceous layer. The metal layer may act as a solderable conductor, contact layer, and/or charge collector for the capacitor, and may be formed from a conductive metal, such as copper, nickel, silver, nickel, zinc, tin, palladium, lead, copper, aluminum, molybdenum, titanium, iron, zirconium, magnesium, and alloys thereof. Silver is a particularly suitable conductive metal for use in the layer. The carbonaceous layer may limit contact between the metal layer and the solid electrolyte, which would otherwise increase the resistance of the capacitor. The carbonaceous layer may be formed from a variety of known carbonaceous materials, such as graphite, activated carbon, carbon black, etc. The thickness of the carbonaceous layer is typically within the range of from about 1 μm to about 50 μm, in some embodiments from about 2 μm to about 30 μm, and in some embodiments, from about 5 μm to about 10 μm. Likewise, the thickness of the metal layer is typically within the range of from about 1 μm to about 100 μm, in some embodiments from about 5 μm to about 50 μm, and in some embodiments, from about 10 μm to about 25 μm.

The present invention may be better understood by the following examples.

EXAMPLE 1

Initially, tantalum powder (specific charge of 59,750 CV/g) was pressed into pellet samples having a length of 5.1 mm, a width of 3.7 mm, and a thickness of 0.9 mm. Tantalum wire (0.24 mm diameter) was inserted into to the anode pellets during the pressing step. The pellets were vacuum sintered at 1320° C. and anodized in 0.1% phosphoric acid electrolyte at 12 V to make capacitors with 330 microfarads at 120 Hz. A conductive polymeric cathode was then formed using sequentially applied CLEVIOS™ C (iron III toluene-sulfonate) and CLEVIOS™ M (3,4-ethylene dioxythiophene). More specifically, CLEVIOS™ C was dissolved in a butanol solvent and applied to the pellets as a dipping solution. The pellets were then dried to remove the solvent therefrom. Thereafter, the pellets were dipped into a solution containing CLEVIOS™ M. The pellets were then re-anodized in 0.1% phosphoric acid and dried at room temperature for two (2) hours. Six (6) repeated sequential dips were performed to build up a consistent polymer outer layer. External carbon and silver coats were formed for finishing the manufacturing process of the anodes.

Once formed, the capacitor elements were attached to a single copper-based leadframe having a flat cathode termination (paddle) and a U-shaped recess for anode lead attaching (anode termination). More particularly, the cathode termination was attached to the lower surface of the capacitor element with a silver adhesive. The anode lead was adjusted to appropriately "seat" the lead onto the U-shaped recess and then laser welded thereto. Once the capacitor element was attached, the leadframe was encapsulated within an epoxy resin and the exposed terminations were bent along the outside of the case. The capacitance (at 120 Hz) and ESR (at 100 kHz) of each part was measured at room temperature using a HP4192A impedance analyzer. The parts were submitted to the standard lead-free reflow profile (255° C. peak temperature) and then re-measured using the same equipment. Table 1 below summarizes the median outputs from three tested samples (90 parts for each sample).

TABLE 1

| | Median (before Reflow) | | Median (after Reflow) | | Difference in ESR (mOhms) |
|---|---|---|---|---|---|
| | Capacitance (µF) (120 Hz) | ESR (mOhms) (100 kHz) | Capacitance (µF) (120 Hz) | ESR (mOhms) (100 kHz) | |
| Sample A | 315.2 | 20.1 | 308.2 | 28.8 | 8.7 |
| Sample B | 322.3 | 21.2 | 316.1 | 29.7 | 8.5 |
| Sample C | 305.1 | 22.3 | 305.7 | 30.5 | 8.2 |

As indicated, the ESR values were significantly increased after reflow. It is believed that this increase in ESR is due in part to the significant difference in the coefficient of thermal expansion differences in the capacitor, which caused intense thermo-mechanical stresses.

EXAMPLE 2

Capacitors were formed as described in Example 1, except that a second leadframe was also employed. The second leadframe was identical to the first leadframe in that it also had a flat cathode termination (paddle) and a U-shaped recess for lead attachment (anode termination). The cathode termination of the second leadframe was attached to the upper surface of the capacitor element (as shown and described herein) through the use of a silver adhesive. The U-shaped recess of the second leadframe was adjusted to receive the anode lead and then laser welded thereto. Once the capacitor element was attached in such a "sandwich" configuration, the leadframes were encapsulated within an epoxy resin and the exposed terminations were bent along the outside of the case. The capacitance (at 120 Hz) and ESR (at 100 kHz) of each part were measured at room temperature using a HP4192A impedance analyzer. The parts were submitted to the standard lead-free reflow profile (255° C. peak temperature) and then re-measured using the same equipment. Table 2 below summarizes the median outputs from three tested samples (90 parts for each sample).

TABLE 2

| | Median (before Reflow) | | Median (after Reflow) | | Difference in ESR (mOhms) |
|---|---|---|---|---|---|
| | Capacitance (µF) (120 Hz) | ESR (mOhms) (100 kHz) | Capacitance (µF) (120 Hz) | ESR (mOhms) (100 kHz) | |
| Sample D | 331.2 | 17.9 | 326.1 | 22.3 | 4.4 |
| Sample E | 323.4 | 18.8 | 318.4 | 21.1 | 2.3 |
| Sample F | 341.8 | 17.4 | 337.2 | 20.9 | 3.5 |

As indicated, the increase in ESR of these samples was substantially smaller than observed with the single leadframe capacitor of Example 1.

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A capacitor assembly comprising:
   a capacitor element that includes an anode, dielectric layer overlying the anode, and a cathode overlying the dielectric layer that includes a solid electrolyte, wherein the capacitor element defines an upper surface and an opposing lower surface;
   an anode lead extending in a direction from the capacitor element and electrically connected to the anode;
   a first anode termination that is electrically connected to the anode lead, the first anode termination containing a third portion positioned at an angle relative to the direction of the anode lead, the third portion defining an upwardly facing recess that receives a lower section of the anode lead;
   a second anode termination that contains a fourth portion positioned at an angle relative to the direction of the anode lead, the fourth portion defining a downwardly facing recess that receives an upper section of the anode lead;
   a first cathode termination that contains a first portion that is substantially parallel to and in electrical contact with the lower surface of the capacitor element;
   a second cathode termination that contains a second portion that is substantially parallel to and in electrical contact with the upper surface of the capacitor element; and
   a case that encapsulates the capacitor element and leaves exposed at least a portion of the first cathode termination, second cathode termination, first anode termination, or a combination thereof.

2. The capacitor assembly of claim 1, wherein the anode lead is positioned between and in electrical contact with the upwardly and downwardly facing recesses.

3. The capacitor assembly of claim 2, wherein the recesses are mated together.

4. The capacitor assembly of claim 2, wherein the upwardly facing recess, the downwardly facing recess, or both, have a U-shape.

5. The capacitor assembly of claim 1, wherein the anode includes tantalum, niobium, or an electrically conductive oxide thereof.

6. The capacitor assembly of claim 1, wherein the solid electrolyte includes manganese dioxide, a conductive polymer, or a combination thereof.

7. A method for forming a capacitor assembly, the method comprising:

providing a solid electrolytic capacitor element from which extends an anode lead in a direction;

positioning the capacitor element onto a first leadframe that contains a first anode termination and a first cathode termination, wherein the first cathode termination contains a first portion that is substantially parallel to a lower surface of the capacitor element and in electrical contact therewith, and wherein the first anode termination contains a recess within which the anode lead is received;

electrically connecting the anode lead to the first anode termination, the first anode termination containing a third portion positioned at an angle relative to the direction of the anode lead, the third portion defining an upwardly facing recess that receives a lower section of the anode lead;

positioning a second leadframe onto the capacitor element that contains a second cathode termination, wherein the second cathode termination contains a second portion that is substantially parallel to an upper surface of the capacitor element and in electrical contact therewith, wherein the second leadframe further comprises a second anode termination that contains a fourth portion positioned at an angle relative to the direction of the anode lead, the fourth portion defining a downwardly facing recess that receives an upper section of the anode lead; and electrically connecting the capacitor element to the first and second cathode terminations.

8. The method of claim 7, wherein a conductive adhesive is disposed between the first portion of the first cathode termination and the lower surface of the capacitor element.

9. The method of claim 7, wherein a conductive adhesive is disposed between the second portion of the second cathode termination and the upper surface of the capacitor element.

10. The method of claim 7, wherein the anode lead is laser welded to the first anode termination at the recess.

11. The method of claim 7, wherein the anode lead is positioned between and in electrical contact with the upwardly and downwardly facing recesses.

12. The method of claim 11, wherein the recesses are mated together.

13. The method of claim 7, wherein the recess has a U-shape.

14. The method of claim 7, further comprising encapsulating the capacitor element in a case so that at least a portion of the first cathode termination, second cathode termination, first anode termination, or a combination thereof, remain exposed.

15. The method of claim 7, wherein the capacitor element includes an anode, dielectric layer overlying the anode, and a cathode overlying the dielectric layer that includes a solid electrolyte.

* * * * *

UNITED STATES PATENT AND TRADEMARK OFFICE
CERTIFICATE OF CORRECTION

| | | |
|---|---|---|
| PATENT NO. | : 8,125,769 B2 | Page 1 of 1 |
| APPLICATION NO. | : 12/841453 | |
| DATED | : February 28, 2012 | |
| INVENTOR(S) | : Lotfi Djebara | |

It is certified that error appears in the above-identified patent and that said Letters Patent is hereby corrected as shown below:

Title Page 2 item 56

The following reference needs to be corrected in the References Cited - Foreign Patent Documents section of the patent:

"JP 2161814" should read --JP 1261814--

Signed and Sealed this
Twenty-eighth Day of August, 2012

David J. Kappos
*Director of the United States Patent and Trademark Office*